United States Patent [19]

Freyberger et al.

[11] Patent Number: 4,618,881
[45] Date of Patent: * Oct. 21, 1986

[54] SET OF THREE INTEGRATED CIRCUITS FOR DIGITAL VIDEO SIGNAL PROCESSING IN COLOR-TELEVISION RECEIVERS

[75] Inventors: Laürin C. Freyberger, Bahlingen, Fed. Rep. of Germany; Daniel Mlynek, Wolfgantzen, France; Friedrich Schmidtpott, Gundelfingen, Fed. Rep. of Germany

[73] Assignee: ITT Industries, Inc., New York, N.Y.

[*] Notice: The portion of the term of this patent subsequent to Jun. 11, 2002 has been disclaimed.

[21] Appl. No.: 716,338

[22] Filed: Mar. 26, 1985

Related U.S. Application Data

[63] Continuation of Ser. No. 465,697, Feb. 10, 1983, Pat. No. 4,523,222.

[30] Foreign Application Priority Data

Feb. 27, 1982 [EP] European Pat. Off. ........ 82101519.5

[51] Int. Cl.[4] .............................................. H04N 9/68
[52] U.S. Cl. .......................................... 358/27; 358/40
[58] Field of Search ............... 358/13, 27, 28, 10, 358/21 R, 39, 40, 139

[56] References Cited

U.S. PATENT DOCUMENTS 4,547,797 10/1985 Mick .................................... 358/27

OTHER PUBLICATIONS

"Eine Neue Dimension-VLSI-Digital TV System", Intermetall, Sep. 1981, pp. 1-23.

"A New Dimension-VLSI Digital TV System", Intermetall, Sep. 1981, pp. 1-23.
"VLSI-Technik Im Fernsehgerät-Eine Basisinnovation", Elektronik, 16/1981, p. 3, Aug. 14, 1981.
"Fernsehen Wird Digital", Fischer, Elektronik, Aug. 1981, pp. 27-35.
"Digital VLSI Breeds Next-Generation TV Receivers"; Fischer, Electronics, Aug. 11, 1981, pp. 97-103.

*Primary Examiner*—Michael A. Masinick
*Attorney, Agent, or Firm*—Donald J. Lenkszus

[57] ABSTRACT

In this IC set, the dark currents and the white levels of the three electron guns, the leakage currents of the cathodes, and a light-detector current are measured during four successive vertical blanking intervals. The cathode leakage currents and the dark currents are measured in the first half of the vertical blanking interval, and the light-detector current and the white-level currents are measured at the end of this interval. From these measured data and alignment data stored in a reprogrammable memory (ps), a microprocessor (mp) contained together with the memory (ps) in an integrated circuit (ic2) derives operating data for the picture tube (b) as well as further data. These operating data are transferred over a wire of a chroma bus (cb), over which chroma signals are transferred during the vertical sweep, into a shift register (sr) of a further integrated circuit (ic3) at the beginning of each vertical blanking interval, from where they are passed on to the picture tube (b) in groups via digital-to-analog converters and analog amplifiers. By the use of the chroma bus for a dual purpose, and the successive measurements of the above-mentioned picture-tube data, a saving of external terminals of the integrated circuits (ic1, ic2, ic3) is achieved.

5 Claims, 1 Drawing Figure

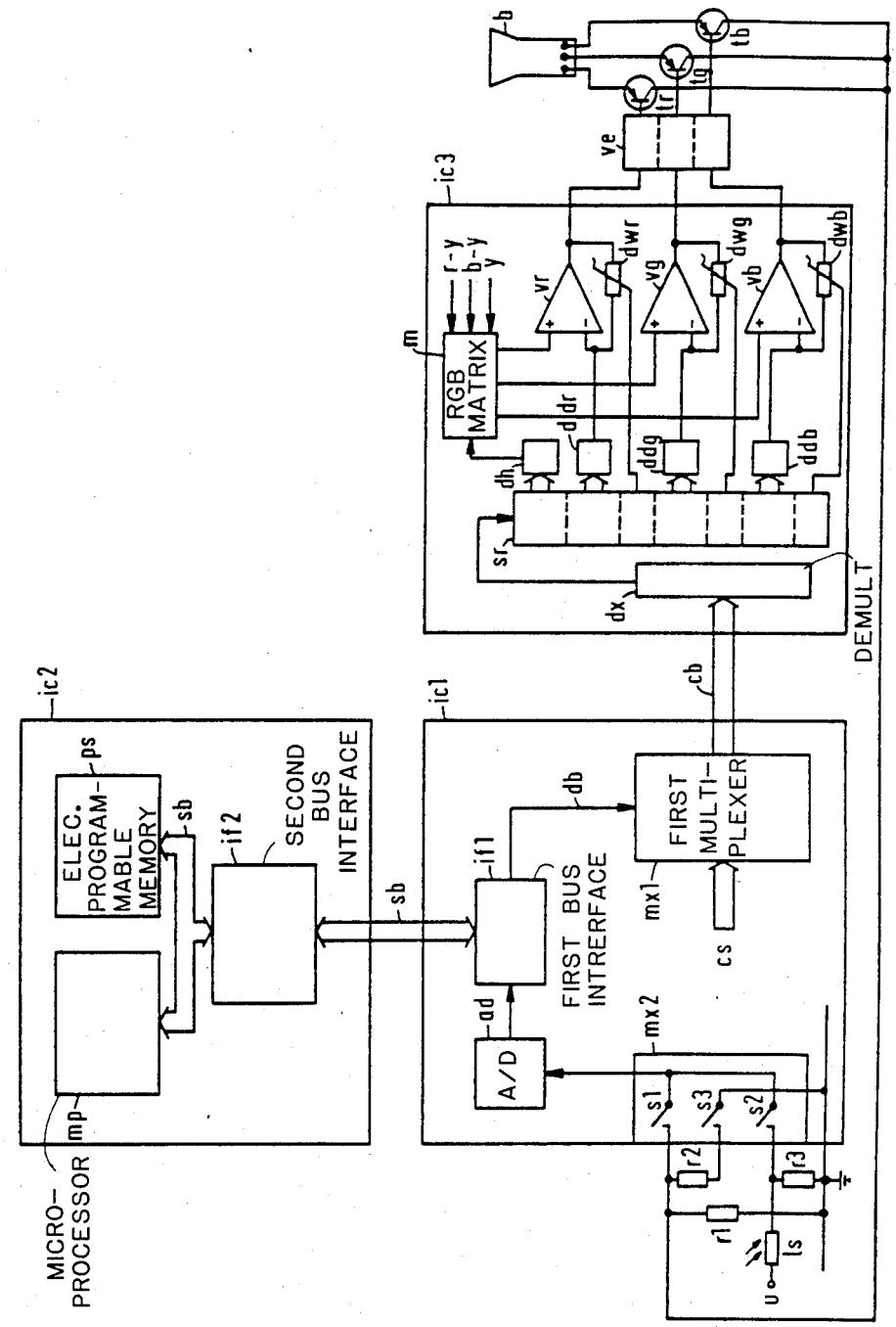

SET OF THREE INTEGRATED CIRCUITS FOR DIGITAL VIDEO SIGNAL PROCESSING IN COLOR-TELEVISION RECEIVERS

RELATED APPLICATION

This is a continuation of U.S. application Ser. No. 465,697, filed Feb. 10, 1983, now U.S. Pat. No. 4,523,222.

FIELD OF THE INVENTION

The present invention relates to a set of three integrated circuits for digital video signal processing in color-television receivers.

BACKGROUND OF THE INVENTION

An IC set of this kind is described in a publication by INTERMETALL entitled "Eine neue Dimension—VLSI-Digital-TV-System", Freiburg im Breisgau, September 1981, on pages 6 to 11 (see also the corresponding English edition entitled "A new dimension—VLSI Digital TV System", also dated September 1981).

The first integrated circuit, designated in the above-mentioned publications by "MAA 2200" and called "Video Processor Unit" (VPU), includes an analog-to-digital converter followed by a first serial-data-bus interface circuit which, in turn, is followed by a first multiplexer. During the vertical blanking interval, the analog-to-digital converter is fed, via a second multiplexer, with measured data corresponding to the cathode currents of the picture tube flowing at "black", i.e. "dark current" and "white" i.e. "white level" in each of the three electron guns, and with the signal of an ambient-light detector. The processed digital chrominance signals are applied to the first multiplexer.

The second integrated circuit, designated by "MAA 2000" and called "central control unit" (CCU) in the above publications, contains a microprocessor, an electrically reprogrammable memory, and a second serial-data-bus interface circuit. The memory holds alignment data and nominal dark-current/white-level data entered by the manufacture of the color-television receiver. From these data and the measured data, the microprocessor derives video-signal-independent operating data for the picture tube.

The third integrated circuit, designated by "MAA 2100" and called "video-codec unit" (VCU) in the above publications, includes a demultiplexer, an analog RGB matrix, and three analog amplifiers each designed to drive one of the electron guns via an external video output stage. After digital-to-analog conversion, the dark current of the picture tube is adjusted via the operating point of the respective analog amplifier, and the white level of the picture tube is adjusted by adjusting the gain of the respective analog amplifier. The demultiplexer is connected to the first multiplexer of the first integrated circuit via a chrome bus.

As to the prior art concerning such digital color-television receiver systems, reference is also made to the journal "Elektronik", Aug. 14, 1981 (No. 16), pages 27 to 35, and the journal "Electronics", Aug. 11, 1981, pages 97 to 103.

During the further development of the prior art system following the above-mentioned publication dates, the developers were faced with the problem of how to accomplish the dark-current/white-level control of the picture tube within the existing system, particularly with respect to measured-data acquisition and transfer and to the transfer of the operating data to the picture tube.

Another requirement imposed during the further development of the prior art system was that the leakage currents of the electron guns of the picture tube be measured and processed within the existing system. The solution of these problems is to take into account the requirement that the number of external terminals of the individual integrated circuits be kept to a minimum.

The object of the invention as claimed is to solve the problems pointed out. The essential principles of the solution, which directly give the advantages of the invention, are, on the one hand, the division of the measurement to four successive vertical blanking intervals and, on the other hand, the utilization of one wire of the chroma bus at the beginning of the next vertical blanking interval as well as the measurement of the ambient light by means of the light-detector and the measurement of the leakage currents during a single vertical blanking interval.

SUMMARY OF THE INVENTION

The invention provides circuitry for digital video signal processing in color television receivers or the like. The circuitry includes video codec circuits including a plurality of analog amplifiers each adopted to drive an electron gun of a picture tube via a video output stage, and circuit means coupled to each said electron gun for providing measured data corresponding to the cathode currents of the picture tube under predetermined conditions flowing in each electron gun. The circuitry further includes microprocessing means utilizing the measured data and predetermined data to derive operating data for the picture tube, the video codec circuits being responsive to the operating data to adjust the operating points and the gains of the plurality of analog amplifiers to adjust the dark currents and while levels, respectively. The circuit means include an analog to digital converter, and a multiplexer for selectively coupling the input of the analog-to-digital converter to each electron gun in successive vertical blanking intervals to provide the measured data.

BRIEF DESCRIPTION OF THE DRAWING

The invention will now be explained in more detail with reference to the accompanying drawing, which is a block diagram of one embodiment of the IC set in accordance with the invention.

DETAILED DESCRIPTION

Referring now to the figure, it shows the first, second, and third integrated circuits ic1, ic2, and ic3, which are drawn as rectangles bordered by heavy lines. The first integrated circuit ic1 includes the analog-to-digital converter, ad, which converts the measured dark-current, white-level, ambient-light, and leakage-current data into digital signals, which are fed to the first bus interface circuit if1. The latter is connected via the line db to the first multiplexer mx1, which interleaves data from the first bus interface circuit if1 with digital chrominance signals cs produced in the first integrated circuit ic1, and places the interleaved signals on the chroma bus cb. The generation of the digital chrominance signals cs is outside the scope of the present invention and is disclosed in the references cited above.

The first integrated circuit ic1 further includes the second multiplexer mx2, which consists of the three electronic switches s1, s2, s3, and represents a subcircuit which is essential for the invention. The input of the first switch s1 is grounded through the first resistor r1, and connected to the collectors of the external transistors tr, tg, tb, each of which is associated with one of the electron guns. Via the base-emitter paths of these transistors, the cathode of the three electron guns are driven by the video output stages ve. The final letters r, g, and b in the reference characters tr, tg, and tb and in the reference characters explained later indicate the assignment to the electron gun for RED (r), GREEN (g), and BLUE (b), respectively. The output of the first switch s1 is connected to the input of the analog-to-digital converter ad.

The input of the second switch is connected to the light detector ls, which has its other terminal connected to a fixed voltage u and combines with the grounded resistor r3 to form a voltage divider. The input of the second switch s2 is thus connected to the tap of this voltage divider, while the output of this switch is coupled to the input of the analog-to-digital converter ad.

The input of the third switch s3 is connected to the input of the first switch s2 via the second resistor r2, while the output of the third switch s3 is grounded. The value of the resistor r1 is about one order of magnitude greater than that of the resistor r2.

For the whole duration of the picture shown on the screen of the picture tube b, and throughout the vertical sweep, the first switch s1 and the third switch s3 are closed, and the second switch s2 is open. During the vertical retrace interval, for the white-level measurement, the switches s1, s3 are closed, and the switch s2 is open. For the dark-current measurement and the leakage-current measurement, the switch s1 is closed, and the switches s2, s3 are open, and for the light-detector-current measurement, the switches s2, s3 are closed, and the switch s1 is open.

The measurements of the dark current and the white level of each electron gun and the measurements of the light-detector current and the leakage currents are made in four successive vertical blanking intervals. One end of the respective cathode is connected to a voltage us for blacker-than-black, and the other end is connected to a voltage ud for black and then to a voltage uw for white, in accordance with the following table:

| Vertical blanking interval No. | Measurement in the first half of the vertical blanking interval | at about the end of the vertical blanking interval | cathode red | green | blue |
| --- | --- | --- | --- | --- | --- |
| 1 | Leakage currents of the cathodes | Light-detector current | us | us | us |
| 2 | Dark current red | White level red | ud/uw | us | us |
| 3 | Dark current green | White level green | us | ud/uw | us |
| 4 | Dark current blue | White level blue | us | us | ud/uw |

The voltage ud for black is, as usual, a voltage which just causes no brightness on the screen of the picture tube b, i.e., a voltage just below the dark threshold of the picture tube. The voltage us for blacker-than-black is then a cathode voltage lying further in the black direction than the voltage for black. The voltage for white is the voltage for the screen brightness to be measured. The brightness of the screen is generally below the maximum permissible value.

Thus, two measurements are made during each vertical blanking interval, namely, one in the first half, preferably at one-third of the pulse duration of the vertical blanking interval, and the other at about the end of the first half. During the four successive vertical blanking intervals, the first measurement determines the leakage currents of the cathodes and the dark currents for red, green, and blue. The second measurements determine the light-detector current and the white levels for red, green, and blue. During the measurement of the cathode leakage currents and the light-detector current, all three cathodes are at the voltage us. During the measurements of the dark current and the white level of the respective cathode, the latter is connected to the respective dark-current voltage ud and white-level cathode voltage uw, respectively, while the cathodes of the two other electron guns, which are not being measured, are at the voltage us.

The second integrated circuit ic2 contains the microprocessor mp, the electrically reprogrammable memory ps, and the second bus interface circuit if2, which is associated with the serial data bus sd in this integrated circuit and also connects the microprocessor mp and the memory ps with one another and with itself. The memory pc holds alignment data and nominal dark-current/white-value data of the picture tube used, which were entered by the manufacturer. From this alignment and nominal data and from the measured data obtained via the second multiplexer mx2 and the analog-to-digital converter ad of the first integrated circuit ic1, the microprocessor mp derives video-signal-independent operating data for the picture tube. The derivation of these operating data is also outside the scope of the invention. It should only be mentioned that with respect to the operating data of th pciture tube, the microprocessor performs a control function in accordance with a predetermined control characteristic.

The third integrated circuit ic3 includes the demultiplexer dx, which is connected to the first multiplexer mx1 of the first integrated circuit ic1 via the chroma bus cb and separates the chrominance signals cs and the operating data of the picture tube from the interleaved signals transferred over the chroma bus. While the transfer of the measured data from the analog-to-digital converter ad to the microprocessor mp of the second integrated circuit ic2 takes place via the two interface circuits if1, if2, and the data but sb at an appropriate instant, the video-signal-independent operating data for the picture tube b, which are derived by the microprocessor mp, are transferred from the second integrated circuit ic2 via the two interface circuits if1, if2, and the line db to the first multiplexer mx1 at an appropriate instant, and from the first multiplexer mx1 over a wire of the chroma bus cb into the shift register sr of the third integrated circuit ic3 shortly after the beginning of the next vertial blanking interval. To accomplish this, the first interface circuit if1 also includes a shift register from which the operating data are read serially.

During this data transfer into the shift register sr, the cathodes of the picture tube b are preferably at the voltage us in order that this data transfer does not become visible on the screen.

The appropriate instant for the transfer of measured data to the microprocessor mp is determined by the microprocessor mp itself, i.e., depending on the program being executed in the microprocessor, and on the time needed. Therfore, the measured data are called for from the interface circuits not at the time of measurement but at a selectable instant within the working program of the microprocessor mp. If the measurement currently being performed should not uet be finished at the instant at which the measured data are called for, in a preferred embodiment of the inventon, the stored data of the previous measurement will be transferred to the microprocessor mp.

As mentioned previously, the operating data for the picture tube b are transferred into the shift register sr at the beginning of a vertical blanking interval. The parallel outputs of this shift register are combined in groups each assigned to one operating value, and each group has one of the digital-to-analog converters dh, ddr, ddg, ddb, dwr, dwg, dwb associated with it. In the figure, the division of the shift register into groups is indicated by broken lines. The shift register sr performs a serial-to-parallel conversion in the usual manner, and the operating data are entered by the demultiplexer dx into the shift register in serial form and are then available at the parallel outputs of the shift register.

The digital-to-analog converter dh provides the analog beightness control signal, which is applied to the RGB matrix m in the integrated circuit ic3. Also applied to the RGB matrix m are the analog color-difference signals r-y, b-y and the luminance signal y. The formation of these signals is outside the scope of the invention and is known per se from the publications cited at the beginning.

The three analog-to-digital converters ddr, ddg, ddb provide the dark-current-adjusting signals for the three cathodes, which are currents and are applied to the inverting inputs (−) of the analog amplifiers vr, vg, vb. Also connected to these inputs is a resistor network which is adjustable in steps in response to the digital white-level-adjusting signals at the respective group outputs of the shift register sr. The resistors serve as digital-to-analog converters dwr, dwg, dwb and establish the connection between the inverting inputs (−) and the outputs of the analog amplifiers vr, vg. vb.

In an arrangement according to the invention which has performed well in practice, each of the three dark-current-adjusting signals is a seven-digit signal, and each of the three white-level-adjusting signals and the brightness control signal are five-digit signals. The voltages us and ud/uw of the three cathodes are assigned a three-digit identification signal in accordance with the above table, which signal is also fed into the shift register sr in the implemented circuit. Finally, a three-digit contrast control signal is provided in the implemented circuit for the Teletext mode of the color-television receiver. These nine data blocks are transferred in the implemented circuit from the demultiplexer dx to the shift register sr in the following order, with the least significant bit transmitted first, and with the specified number of blanks: identification signal; white-level signal blue; three blanks; white-level signal green; three blanks; white-level signal red; one blank; dark-current signal red; contrast signal Teletext; and brightness control signal. These are seven eight-digit data blocks which are assigned to 56 pulses of a 4.4-MHz clock signal of the shift register sr.

It should be noted that the data sequence just described does not correspond to the order of the groups of the shift register sr in the figure. The order in the figure was chosen only for the sake of clarity.

The outputs of the three analog amplifiers vr, vg, vb are coupled to the inputs of the video output stage ve, whose outputs, as explained previously, are connected to the bases of the transistors pr, tg, td, so that the cathodes of the picture tube b are driven via the base-emitter paths of these transistors.

In another preferred embodiment of the invention, the measurement performed during a vertical blanking interval is not enabled until the date of the previous measurement has been transferred into the microprocessor mp. In this manner, no measurement will be left out. It is also possible to omit the digital-to-analog converter dh if the analog RGB matrix m is replaced with a digital one.

One advantage of the invention is that the use of the chroma bus for the transfer of operating data facilitates the implementation of the third integrated circuit ic3 using bipolar technology, because an additional bus interface circuit, which could be used there, would occupy too much chip area.

We claim:
1. Circuitry for digital video signal processing in color television receivers or the like, comprising:
    video codec circuits including a plurality of analog amplifiers each adopted to drive an electron gun of a picture tube via a video output stage;
    circuit means coupled to each said electron gun for providing measured data corresponding to the cathode currents of said picture tube under predetermined conditions flowing in each said electron gun;
    microprocessing means utilizing said measured data and predetermined data to derive operating data for said picture tube, said video codec circuits being responsive to said operating data to adjust the operating points and the gains of said plurality of analog amplifiers to adjust the dark currents and white levels, respectively;
    said circuit means including: an analog to digital converter, a multiplexer for selectively coupling the input of said analog-to-digital converter to each said electron gun in successive vertical blanking intervals to provide said measured data.
2. Circuitry in accordance with claim 1 wherein:
    said multiplexer couples the input of said analog-to digital converter to a light detector during one of said successive vertical blanking intervals.
3. Circuitry in accordance with claim 1 wherein:
    said video codec circuits include a register for storing said operating data, a plurality of digital-to-analog converters each having its inputs coupled to said register to receive operating data for a respective one amplifier of said plurality of analog amplifiers, and having its outputs coupled to said respective one amplifier to control the gain and operating point thereof.
4. Circuitry in accordance with claim 3 wherein:
    said circuit means transfers said measured data to said microprocessing means, said circuit means not obtaining new measured data until measured data of a prior measurement has been transferred to said microprocessing means.
5. Circuitry in accordance with claim 3 wherein:
    said microprocessing means determining the appropriate instant for transfer of said measured data and if a measurement has not yet been finished at said instant, then measured data of the corresponding earlier measurement are transferred.

* * * * *